(12) United States Patent
Li et al.

(10) Patent No.: US 11,928,563 B2
(45) Date of Patent: Mar. 12, 2024

(54) MODEL TRAINING, IMAGE PROCESSING METHOD, DEVICE, STORAGE MEDIUM, AND PROGRAM PRODUCT

(71) Applicant: Beijing Baidu Netcom Science Technology Co., Ltd., Beijing (CN)

(72) Inventors: Xingjian Li, Beijing (CN); Haoyi Xiong, Beijing (CN); Dejing Dou, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 435 days.

(21) Appl. No.: 17/355,347

(22) Filed: Jun. 23, 2021

(65) Prior Publication Data

US 2021/0319262 A1 Oct. 14, 2021

(30) Foreign Application Priority Data

Dec. 18, 2020 (CN) .......................... 202011510141.X (51) Int. Cl.
*G06N 20/00* (2019.01)
*G06F 18/214* (2023.01)
(Continued)

(52) U.S. Cl.
CPC ........... *G06N 20/00* (2019.01); *G06F 18/214* (2023.01); *G06F 18/22* (2023.01); *G06F 18/24* (2023.01);
(Continued)

(58) Field of Classification Search
None
See application file for complete search history.

(56) References Cited

U.S. PATENT DOCUMENTS 11,783,227 B2 * 10/2023 Li ...................... G06F 11/3452
706/12
2018/0330205 A1 11/2018 Wu et al.
(Continued)

FOREIGN PATENT DOCUMENTS

| CN | 108548669 A | 9/2018 |
| CN | 110032935 A | 7/2019 |

(Continued)

OTHER PUBLICATIONS

Extended European Search Report for corresponding European patent application No. 21181044.5 dated Mar. 21, 2022, 15 pages.
(Continued)

*Primary Examiner* — Dov Popovici
(74) *Attorney, Agent, or Firm* — Harness, Dickey & Pierce, P.L.C.

(57) ABSTRACT

The present application provides a model training, image processing method, device, storage medium, and program product relating to deep learning technology, which are able to screen auxiliary image data with image data for learning a target task, and further fuse the target image data and the auxiliary image data, so as to train a built and to-be-trained model with the fusion-processed fused image data. This implementation can increase the amount of data for training the model, and the data for training the model is determined is based on the target image data, which is suitable for learning the target task. Therefore, the solution provided by the present application can train an accurate target model even if the amount of target image data is not sufficient.

20 Claims, 7 Drawing Sheets

Acquiring target image data for learning a target task, and source image data for learning a preset task — 201

Determining auxiliary image data in the source image data according to the target image data — 202

Determining a to-be-trained model according to a trained preset model corresponding to the preset task and a preset classification network — 203

Determining fused image data according to the target image data and the auxiliary image data, and training the to-be-trained model with the fused image data, to obtain a target model for executing the target task — 204

(51) Int. Cl.
    *G06F 18/22*     (2023.01)
    *G06F 18/24*     (2023.01)
    *G06F 18/25*     (2023.01)
    *G06N 5/04*      (2023.01)
    *G06V 10/774*    (2022.01)
    *G06V 10/82*     (2022.01)
    *G06V 10/84*     (2022.01)

(52) U.S. Cl.
    CPC .............. *G06F 18/251* (2023.01); *G06N 5/04* (2013.01); *G06V 10/774* (2022.01); *G06V 10/82* (2022.01); *G06V 10/84* (2022.01)

(56) References Cited

U.S. PATENT DOCUMENTS

| | | | | |
|---|---|---|---|---|
| 2020/0104710 | A1* | 4/2020 | Vasudevan | G06N 3/045 |
| 2020/0265272 | A1 | 8/2020 | Zhang et al. | |
| 2022/0374776 | A1* | 11/2022 | Liu | G06N 3/096 |

FOREIGN PATENT DOCUMENTS

| | | |
|---|---|---|
| CN | 110598752 A | 12/2019 |
| CN | 110647920 A | 1/2020 |
| CN | 111144451 A | 5/2020 |
| CN | 111444878 A | 7/2020 |
| CN | 111783949 A | 10/2020 |
| CN | 112016633 A | 12/2020 |
| CN | 112990262 A | 6/2021 |
| JP | 2020-115288 A | 7/2020 |
| WO | 2020165610 A1 | 8/2020 |
| WO | 2020173329 A1 | 9/2020 |

OTHER PUBLICATIONS

Deng, Xin et al.: "Deep Convolutional Neural Network for Multi-Modal Image Restoration and Fusion", IEEE Transactions on Pattern Analysis and Machine Intelligence, IEEE Computer Society, vol. 43, No. 10, XP011875125, Apr. 2, 2020, pp. 3333-3348.
Guo, Yingchun et al.: "Deep Regression Neural Network for End-to-End Person Re-Identification", IEEE Access, vol. 7, XP011736460, Jul. 9, 2019, pp. 92825-92837.
Li, Xingjian et al.: "SMILE: Self-Distilled Mixup for Efficient Transfer Learning", arxiv.org, Cornell University Library, XP081916958, Mar. 25, 2021, 13 pages.
Yun, Sangdoo et al.: "CutMix: Regularization Strategy to Train Strong Classifiers with Localizable Features", arxiv.org, Cornell University Library, XP081457137, May 13, 2019, 14 pages.
Zhang, Hongyi et al: "Mixup: Beyond Empirical Risk Minimization", XP055716970, Retrieved from the Internet: URL:https://arxiv.org/pdf/1710.09412.pdf, Apr. 27, 2018, 13 pages.
Wenqiang, Guo et al., "BN parameter learning algorithm based on dynamic weighted transfer learning", Application Research of Computers, vol. 38, No. 1, Jan. 2021, pp. 110-114, with English abstract.
Shuo, Chen, Thesis Submitted to Tsinghua University, "Research on Transfer Learning Algorithm based on Generating Weighted Subspaces", May 2017, with English abstract.
Zhang, Zhaoxiang et al., "Transferring Training Instances for Convenient Cross-View Object Classification in Surveillance", IIEE Transactions on Information Forensics And Security, vol. 8, No. 10, Oct. 2013.
Office Action dated Sep. 14, 2022 in corresponding Japanese Patent Application No. 2021-144262, with English translation.
Chinese Office Action regarding Application No. 202011510141.X, dated Dec. 26, 2023 (with English machine translation).

* cited by examiner

MODEL TRAINING, IMAGE PROCESSING METHOD, DEVICE, STORAGE MEDIUM, AND PROGRAM PRODUCT

CROSS-REFERENCE TO RELATED APPLICATION

The present application claims priority to Chinese Patent Application No. 202011510141.X, filed on Dec. 18, 2020, which is hereby incorporated by reference in its entirety.

TECHNICAL FIELD

The present application relates to deep learning technology in computer technology, and in particular to a model training, image processing method, device, storage medium, and program product.

BACKGROUND

In recent years, deep learning technology has made huge technological breakthroughs and has been rapidly applied and popularized. Models can be trained based on deep learning technology, thus artificial intelligence products are capable of being obtained.

Upon training a model based on deep learning technology, huge labeled samples are needed. The more data in the sample, the more accurate the trained model. However, in practical application scenarios, it is difficult to collect a large amount of data with labeled samples. Therefore, in the prior art, this problem is solved through transfer learning.

Transfer learning is to fine-tune a pre-training model fully trained with big data to obtain a target model, and in particular, fine-tune the pre-training model according to the target task to be realized. However, when the sample size of the target task is limited, the model obtained by fine-tuning is not accurate.

SUMMARY

The present application provides a model training, image processing method, device, storage medium, and program product, to solve the problem that the target model obtained by adjusting the preset model is inaccurate when the sample size of the target task is limited in the prior art.

According to a first aspect of the present application, a model training method is provided, including:
acquiring target image data for learning a target task, and source image data for learning a preset task;
determining auxiliary image data in the source image data according to the target image data;
determining a to-be-trained model according to a trained preset model corresponding to the preset task and a preset classification network;
determining fused image data according to the target image data and the auxiliary image data, and training the to-be-trained model with the fused image data, to obtain a target model for executing the target task.

According to a second aspect of the present application, an image processing method is provided, including:
acquiring a to-be-processed image;
recognizing the to-be-processed image according to the target model to determine a classification result corresponding to the to-be-processed image; where the target model is a target model trained by the model training method according to the first aspect.

According to a third aspect of the present application, a model training apparatus is provided, including:
an acquiring unit, configured to acquire target image data for learning a target task, and source image data for learning a preset task;
a data screening unit, configured to determine auxiliary image data in the source image data according to the target image data;
a model building unit, configured to determine a to-be-trained model according to a trained preset model corresponding to the preset task and a preset classification network;
a fusing unit, configured to determine fused image data according to the target image data and the auxiliary image data;
a training unit, configured to train the to-be-trained model with the fused image data to obtain a target model for executing the target task.

According to a fourth aspect of the present application, an image processing apparatus is provided, including:
an acquiring unit, configured to acquire a to-be-processed image;
a recognizing unit, configured to recognize the to-be-processed image according to the target model to determine a classification result corresponding to the to-be-processed image; where the target model is the target model trained by the model training method according to the first aspect.

According to a fifth aspect of the present application, an electronic device is provided, including:
at least one processor; and
a memory communicatively connected with the at least one processor; wherein,
the memory stores instructions executable by the at least one processor, and the instructions are executed by the at least one processor to enable the at least one processor to execute the method according to the first aspect or the second aspect.

According to a sixth aspect of the present application, a non-transitory computer-readable storage medium storing computer instructions is provided, and the computer instructions are used for causing the computer to execute the method according to the first aspect or the second aspect.

According to a seventh aspect of the present application, a computer program product is provided, including a computer program, which, when executed by a processor, implements the method according to the first aspect or the second aspect.

It should be understood that the content described in this section is not intended to identify the key or important features of embodiments of the present application, nor is it intended to limit the scope of the present application. Other features of the present application will be easily understood from the following description.

BRIEF DESCRIPTION OF DRAWINGS

The drawings are for better understanding the present solution, and do not constitute a limitation to the present application. where.

DESCRIPTION OF EMBODIMENTS

Exemplary embodiments of the present application are described below with reference to the drawings, including various details of the embodiments of the present application to facilitate understanding, which should be considered as merely exemplary. Therefore, those of ordinary skill in the art should realize that various changes and modifications can be made to the embodiments described herein without departing from the scope and spirit of the present application. Likewise, for the sake of clarity and conciseness, descriptions of well-known functions and structures are omitted in the following description.

At present, deep learning technology is adopted in more and more application scenarios, which can learn data with label to obtain the required model. However, in order to train and obtain an accurate model, a large amount of data with label is needed.

However, in the practical application processes, it is difficult to collect a large amount of data with labeled samples. Therefore, in deep learning scenarios, transfer learning can be adopted for model training.

Transfer learning is a machine learning method in which a pre-trained model is reused in another task. The pre-training model can be fine-tuned with target samples corresponding to the target task to obtain the target model.

Figure 1:
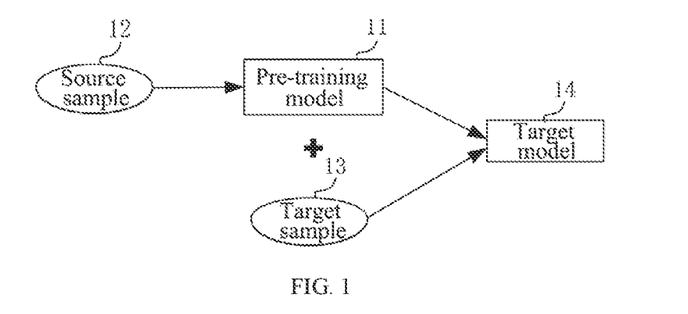
FIG. 1 is a schematic diagram of transfer learning shown by an exemplary embodiment.

FIG. 1 is a schematic diagram of transfer learning according to an exemplary embodiment.

As shown in FIG. 1, the pre-training model 11 is obtained through training of source samples 12, and the pre-training model may be, for example, an existing model in the prior art. The target model 14 can be obtained by fine-tuning the pre-training model 11 with target samples 13. For example, the pre-training model 11 can be secondarily trained with the target samples 13 to obtain the target model 14.

However, if the size of target samples is limited, the adjusted target model is not accurate upon task processing. Therefore, how to train an accurate target model under the condition that the size of target samples is limited is a technical problem that needs to be solved.

Especially when the samples are image data, a large amount of image data needs to be labeled to obtain a sufficient amount of target samples. However, the method for the target to obtain samples is the method for manual labeling. Manual labeling of a large amount of image data is inefficient, resulting in low model training efficiency.

In order to solve the above technical problems, in the method provided by the present application, auxiliary image data is determined from source image data for learning the preset task according to the target image data for learning the target task, and thereafter, the pre-training model is adjusted according to the target image data and the auxiliary image data. In this implementation, data for adjusting the pre-training model can be added, so as to enable the adjusted model more accurate upon task processing.

The present application provides a model training, image processing method, device, storage medium, and program product, which are applied to deep learning technology in computer technology.

Figure 2:
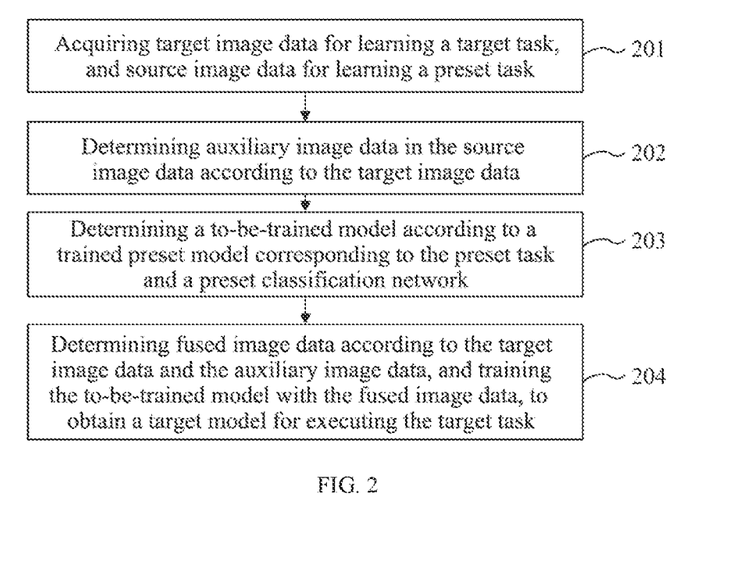
FIG. 2 is a schematic flowchart of a model training method shown by an exemplary embodiment of the present application.

FIG. 2 is a schematic flowchart of a model training method shown by an exemplary embodiment of the present application.

As shown in FIG. 2, the model training method provided by the present application includes:

step 201: acquiring target image data for learning a target task, and source image data for learning a preset task, where the method provided by the present application is executed by an electronic device with computing capability, and the electronic device may be, for example, a computer.

The target task is a task that needs to be learned currently. For example, if the user wishes to train a model which is able to recognize a kitten included in an image, then the target task refers to the task of recognizing the kitten included in the image.

The data for learning the target task is target image data, and the model obtained by learning the target task is the target model. If the amount of the target image data is large enough, an accurate target model can be trained. However, in practical processes, it is often impossible to obtain sufficient target image data. Therefore, it is impossible to obtain an accurate target model by training only according to the existing target images.

Specifically, a preset task refers to a task that has been learned and completed. For example, the preset task may be a task of recognizing an object in an image. The model obtained by learning the preset task is the preset model.

Further, the data for learning the preset task is source image data, and the model obtained by learning the preset task is the preset model. In the method provided by the present application, the preset model can be obtained by training with an existing database, and thereafter, the obtained preset model can be adjusted to obtain the target model.

In one implementation, the imageNet database (a large-scale visualization database for visual object recognition software research) can be used for model training to obtain the preset model.

In practical applications, the electronic device can acquire target image data for learning the target task. The target image data includes the target image, and the target image data also includes a label of each target image. The target image data, for example, can be stored in the electronic device that executes the method provided by the present application. When the electronic device executes the method of this embodiment, the target image data can be acquired.

Where the electronic device can also acquire source image data for learning the preset task. The source image data includes the source image, and the source image data may also include a label of each source image. The source image data can be stored in a network platform, for example, can be stored in a server.

Specifically, when the electronic device executes the method provided by in this embodiment, the source image data can be downloaded from a network platform.

Step 202: determining auxiliary image data in the source image data according to the target image data.

Further, the electronic device is able to screen auxiliary image data from the source image data according to the acquired target image data.

In actual application, the auxiliary image data includes auxiliary images, and the auxiliary image data may also include a label of each auxiliary image.

Where the electronic device is able to screen the image data similar to the target image data from the source image data as auxiliary image data. For example, it is possible to calculate the similarity between each source image in the source image data and each target image in the target image data, and use the source image similar to the target image as the auxiliary image to obtain the auxiliary image data.

For example, there are a plurality of source image data and target image data, and for each target image data, the similarity between the target image in the target image data and the source image in the source image data can be determined.

Figure 3:
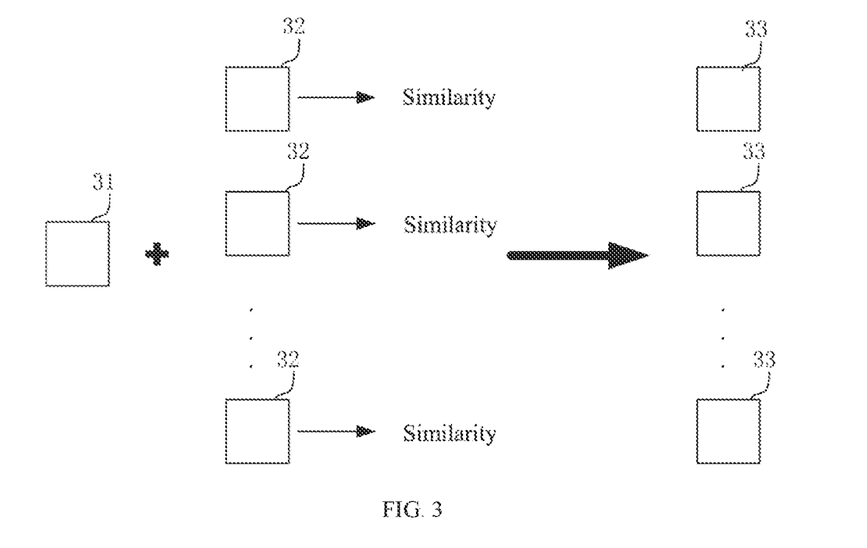
FIG. 3 is a schematic diagram of screening auxiliary image data shown by an exemplary embodiment of the present application.

FIG. 3 is a schematic diagram of screening auxiliary image data provided by an exemplary embodiment of the present application.

As shown in FIG. 3, the similarity between the target image 31 and each source image 32 can be determined, and thereafter, the auxiliary image 33 that meets the requirements can be screened from the source image 32 according to the determined similarity. Where the auxiliary image 33 and label thereof constitute the auxiliary image data. The auxiliary image data similar to the target image data can be screened from the source image data through the target image data, so as to increase the sample size for adjusting the preset model according to the auxiliary image data.

Step 203: determining a to-be-trained model according to a trained preset model corresponding to the preset task and a preset classification network.

Specifically, the electronic device may build the to-be-trained model with the trained preset model and the preset classification network.

Further, the preset model is obtained by training with an existing image database, and the source image in the database includes the image similar to the target image.

In actual application, the method provided by the present application can use the feature extraction network in the preset model, and the to-be-trained model can be built according to the feature extraction network in the preset model and the preset classification network.

Since the preset task is different from the target task, the classification result between the preset model obtained by learning the preset task and the target model for learning the target task is different. Therefore, in the method provided by the present application, a preset classification network is involved according to the target model, and the to-be-trained model is built according to the feature extraction network in the preset model and the preset classification network.

Specifically, the method provided by the present application uses target image data and auxiliary image data to train the to-be-trained model. Therefore, the dimension of the classification result output by the preset classification network can be set to the total number of label categories of the target image data and the auxiliary image data.

Step 204: determining fused image data according to the target image data and the auxiliary image data, and training the to-be-trained model with the fused image data, to obtain a target model for executing the target task.

Further, the electronic device may fuse the acquired target image data and the determined auxiliary image data to obtain fused image data.

In practical application, the electronic device can fuse the images in the target image data and the auxiliary image data to obtain a fused image, and can also fuse the labels in the target image data and the auxiliary image data to obtain a fused label corresponding to the fused image.

Where the to-be-trained model can be trained with the fused image data including the fused image and the fused label.

Specifically, arbitrary target image data and auxiliary image data can be fused, so as to obtain a large amount of sample data for training the to-be-trained model. In this way, a large amount of data for training the model can be obtained without manual labeling, and further an accurate target model can be trained.

Further, when fusing the target image data and the auxiliary image data in the present application, the image itself can be fused, and the label of the image can also be fused, such that when the model is being trained, the determined loss function result is also the result after fusion, and the model training result can be further improved.

Further, part of the target image data and auxiliary image data may be acquired first, and the fused image data may be determined. The to-be-trained model is further trained with the determined fused image data, hereafter, a part of the target image data and auxiliary image data is further acquired, and the fused image data is determined. Further, the to-be-trained model is trained with the determined fused image data, so as to obtain the target model by training through multiple training iterations.

The model training method provided by the present application includes: acquiring target image data for learning a target task, and source image data for learning a preset task; determining auxiliary image data in the source image data according to the target image data; determining a to-be-trained model according to a trained preset model corresponding to the preset task and a preset classification network; determining fused image data according to the target image data and the auxiliary image data, and training the to-be-trained model with the fused image data, to obtain a target model for executing the target task. The model training method provided by the present application is able to screen auxiliary image data with image data for learning a target task, and further fuse the target image data and the auxiliary image data, so as to train a built and to-be-trained model with the fusion-processed fused image data. This implementation can increase the amount of data for training the model, and the data for training the model is determined is based on the target image data, which is suitable for learning the target task. Therefore, the method provided by the present application can train an accurate target model even if the data amount of target image is not sufficient.

Figure 4:
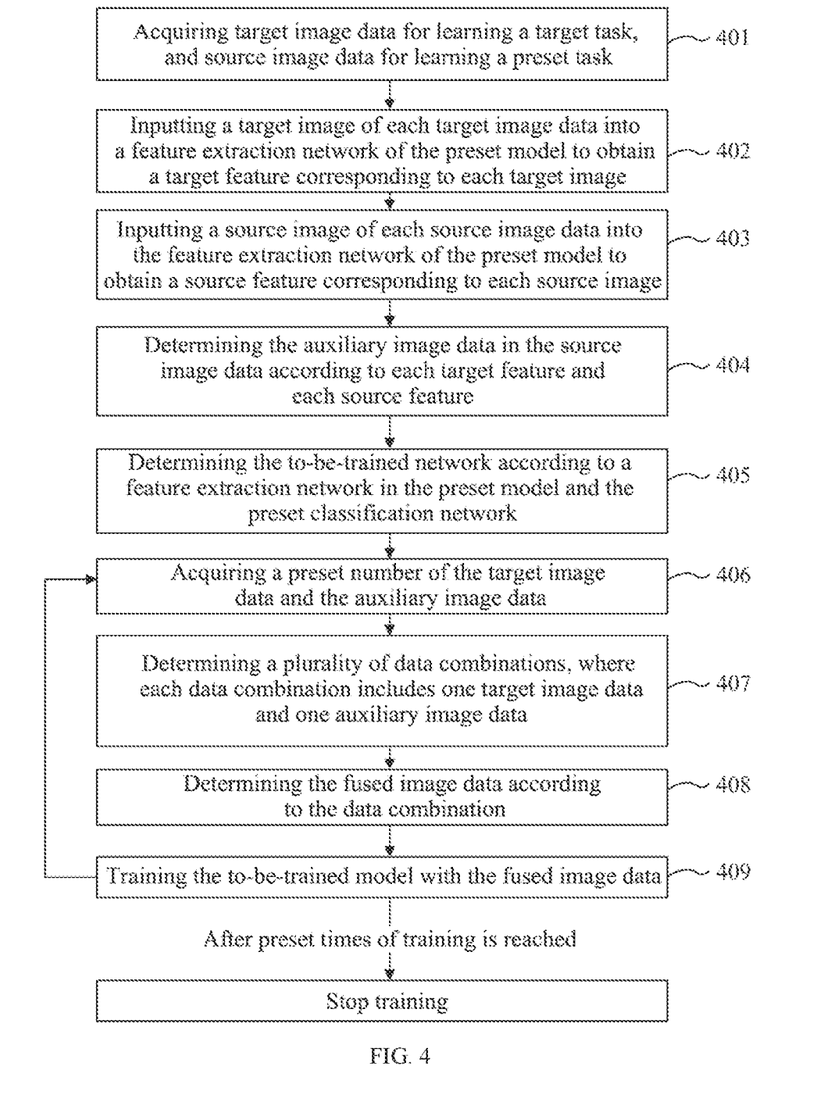
FIG. 4 is a schematic flowchart of a model training method shown by another exemplary embodiment of the present application.

FIG. 4 is a schematic flowchart of a model training method shown by another exemplary embodiment of the present application.

As shown in FIG. 4, the model training method provided by the present application includes:

step 401: acquiring target image data for learning a target task, and source image data for learning a preset task.

The implementation and implementing principle of step 401 are similar to those of step 201, and will not be described again.

Step 402: inputting a target image of each target image data into a feature extraction network of the preset model to obtain a target feature corresponding to each target image.

Step 403: inputting a source image of each source image data into the feature extraction network of the preset model to obtain a source feature corresponding to each source image.

Where the execution timing between step 402 and step 403 is not limited.

Specifically, when the electronic device determines the auxiliary image data in the source image data, it is possible to use the feature extraction network in the preset model to extract features of the target image and the source image respectively, and further screen the source image data according to the features of both.

The preset model is a model obtained by performing preset task learning with the source image data. The source image and target image can be directly analyzed with the feature extraction network in this model.

Further, the target image data includes the target image and its label, and each target image in the target image data can be acquired and inputted into the feature extraction network of the preset model, so as to obtain the target feature of each target image.

In actual application, the source image data includes the source image and its label, and each source image in the source image data can be acquired and inputted into the feature extraction network of the preset model, so as to obtain the source feature of each source image.

In the implementation, the features of the source image and the target image are extracted with the same feature extraction network. Since the feature extraction methods are the same, the extracted source feature and the target feature have comparability.

Step 404: determining the auxiliary image data in the source image data according to each target feature and each source feature.

Where the electronic device can compare the determined respective target feature and the respective source feature. For example, the target features can be compared with the source features in pairs, and the auxiliary image data can be determined in the source image data according to the comparison result.

Specifically, the electronic device is able to screen the feature similar to any target feature from the source features, and thereafter, determine the source image to which the source feature belongs as the auxiliary image, and further can use the auxiliary image and its label as an auxiliary image data.

This method is able to screen the auxiliary image data from the source image data based on the image features, and the screened auxiliary image data is more similar to the target image data, which is more in line with the needs for learning the target task.

Further, when the auxiliary image data is determined according to the features of the images, the similarity between each target image and each source image may be specifically determined according to each target feature and each source feature. The similarity between the images can be determined according to the features of the images, such that the degree of similarity between the two images can be characterized by the similarity. For example, the Euclidean distance between a target feature and a source feature can be determined as the similarity between the images to which the features belong.

In actual application, the target feature of a target image can be acquired, and the similarity between the target image and each source image can be determined according to the target feature and the source feature of each source image.

Where source image data to which belongs the source image similar to the target image is determined as the auxiliary image data according to the similarity.

Specifically, a source image similar to the target image can be determined according to the similarity, and the source image data to which the source image belongs can be used as auxiliary image data. Therefore, the auxiliary image data includes a source image similar to the target image, and a label of the source image.

In this implementation, based on the feature of each image, auxiliary image data similar to the target image data can be determined from the source image data, thereby determining data suitable for learning the target task.

Step 405: determining the to-be-trained network according to a feature extraction network in the preset model and the preset classification network.

Further, the method provided by the present application can use the feature extraction network in the preset model, and specifically can connect the preset classification network behind the feature extraction network to obtain the to-be-trained network.

Figure 5:
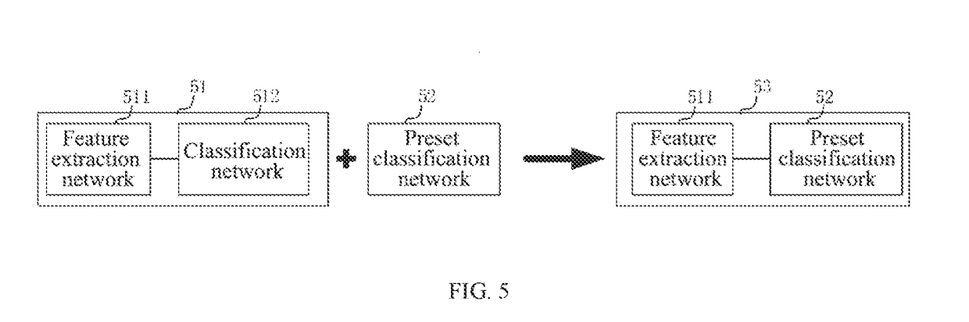
FIG. 5 is a schematic diagram of a to-be-trained model shown by an exemplary embodiment of the present application.

FIG. 5 is a schematic diagram of a to-be-trained model shown by an exemplary embodiment of the present application.

As shown in FIG. 5, the preset model 51 includes a feature extraction network 511 and a classification network 512. The feature extraction network 511 is configured to extract features of the image data of the input model, and the classification network 512 is configured to obtain classification results according to the features extracted by the feature extraction network 511, and further obtain recognition results of the image data of the input model.

The to-be-trained model 53 can be built according to the preset model 51 and the preset classification network 52. The to-be-trained model 53 includes the feature extraction network 511 in the preset model 51 and further the preset classification network 52.

Where in the to-be-trained model 53, the features output by the feature extraction network 511 are input into the preset classification network 52. Therefore, the feature input dimension of the preset classification network 52 is the same as the output dimension of the feature extraction network 511, and both can link up very well.

The preset model is trained with source image data, and the feature extraction network in the preset model can extract features of the source image data. Therefore, the feature extraction network can be adjusted with the target image data and the auxiliary image data to make it suitable for processing the target task. In this implementation, the feature extraction network of the preset model can be adjusted to a network suitable for performing the target task without requiring a large amount of target image data.

Specifically, output dimension of the preset classification network is the same as the total number of labels included in the target image data and the auxiliary image data. For example, if the labels in the target image data include A, B, and C, and the labels in the auxiliary image data include A, B, and D, the total number of labels is 4, thus the output dimension of the preset classification network can be set to 4.

Further, the output dimension of the preset classification network is set to the total number of labels. When the target image data and auxiliary image data are used to repeatedly train the to-be-trained model, the preset classification network can recognize the label corresponding to the target image data and the auxiliary image data according to the features extracted by the feature extraction network, and, such that the output results of the preset classification network meet the user's needs.

In practical application, there is no limitation on execution timing of the steps of determining the auxiliary image data and determining the to-be-trained model.

Step 406: acquiring a preset number of the target image data and the auxiliary image data.

In one implementation, the target image data and the auxiliary image data may be fused several times, and the fused data obtained by each fusion may be used to train the to-be-trained model.

A preset number can be set, and thus the preset number of target image data and the preset number of auxiliary image data are acquired each time. For example, n target image data and n auxiliary image data are acquired each time.

The preset number can be determined according to the number of training samples input each time upon training the model.

Step 407: determining a plurality of data combinations, each of which comprises one target image data and one auxiliary image data.

Where the acquired target image data and auxiliary image data may be grouped, and each combination may include one target image data and one auxiliary image data. For example, one target image data and each acquired auxiliary image data can be treated as a combination. For example, if target image data A1, B1, C1 are acquired and auxiliary image data A2, B2, C2 are acquired, for a target image data A1, three combinations can be constructed, namely A1 A2, A1 B2, A1 C2, and for B1 and C1, three combinations can also be constructed respectively.

Specifically, the target image data and the auxiliary image data in a same acquisition order can also be treated as one data combination.

Figure 6:
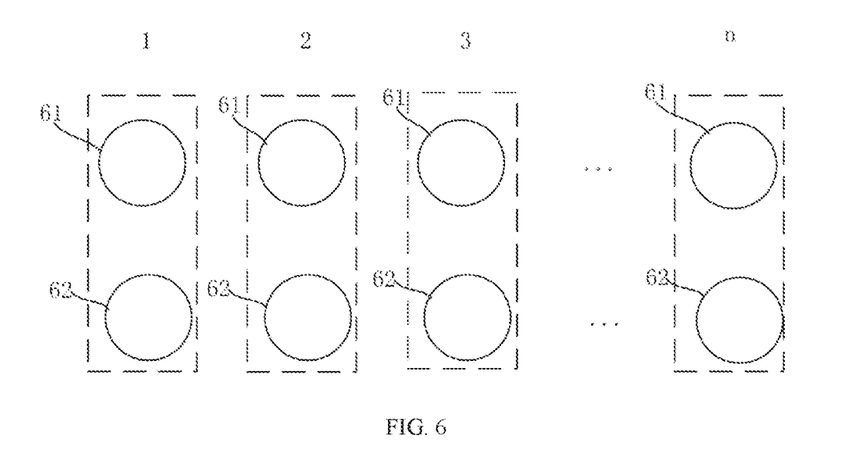
FIG. 6 is a schematic diagram of generating a data combination shown by an exemplary embodiment of the present application.

FIG. 6 is a schematic diagram of generating a data combination shown by an exemplary embodiment of the present application.

As shown by FIG. 6, when n target image data is acquired, the acquisition order of each target image data 61 is 1, 2, 3 . . . n, and when n auxiliary image data is acquired, the acquisition order of each auxiliary image data 62 is 1, 2, 3 . . . n. The target image data and the auxiliary image data in a same acquisition order may be treated as one data combination. For example, the target image data and the auxiliary image data whose acquisition order is both 1 are regarded as a group.

In this implementation, the current data combination can be quickly determined, thereby increasing the speed of model training.

Step 408: determining the fused image data according to the data combination.

Specifically, the method provided by the present application can perform fusion processing on the target image data and the auxiliary image data included in each data combination to obtain the fused image data of the data combination.

In this implementation, data related to the current target task can be fully used, and the model can be optimized under the condition that the target image data is limited.

Further, when fusing the data included in each data combination, the target image and the auxiliary image belonging to the same data combination can be fused to determine the fused image; the label of the fused image is determined by fusing the label of the target image and the label of the auxiliary image.

In actual application, the target image in the target image data and the auxiliary image in the auxiliary image data in the data combination can be fused, and the label of the target image in the image data and the label of the auxiliary image in the auxiliary image data can be fused, so as to obtain the fused image and label thereof.

Where the fused image includes features of the target image and the auxiliary image, and both the target image and the auxiliary image are suitable for learning the data of the target task. Therefore, the fused image also includes data features suitable for learning the target task. This method can obtain new image data for learning the target task.

Specifically, the method of the present application also fuses the labels of the target image and the auxiliary image. In the process of training the model, the fused label is used to calculate the loss function, and the fused label can accurately express the classification result of the fused image. Therefore, the target model obtained by training the model with the fused label is more accurate.

Further, when fusing the target image data and the auxiliary image data, a random weight value can also be acquired, and the target image data and the auxiliary image data can be fused with the random weight value.

In practical application, random weight value can be used to fuse the target image and the auxiliary image to obtain a fused image, and the random weight value can be used to fuse the label of the target image and the label of the auxiliary image to obtain the label of the fused image.

The image and the label is fused with the same random weight value, so as to enable the fused label to express the information in the fused image more accurately.

Where the same random weight value can be used to fuse the target image data and auxiliary image data acquired this time, and further another random weight value can be acquired to fuse the target image data and auxiliary image data acquired next time.

Using different random weight values to fuse different combinations of target image data and auxiliary image data, the ratio of target image data to auxiliary image data included in the fused image data obtained each time is also different, and thus richer sample data can be obtained.

Specifically, the fused image is $M=\alpha*S+(1-\alpha)*T$; and the label of the fused image is $LM=\alpha*LS+(1-\alpha)*LT$; where a is the random weight value, T is the target image, S is the auxiliary image, LT is the label of the target image, and LS is the label of the auxiliary image.

Further, the acquired random weight value can be directly used to obtain the fused image and its label based on the above formula. As shown in the above formula, in the fused image data, the feature ratio of the auxiliary image data is $\alpha$, and the feature ratio of the target image data is $(1-\alpha)$. This method can effectively fuse the information in the auxiliary image data and the target image data.

In practical application, each pixel in the target image and the auxiliary image can be effectively fused according to the random weight value to obtain the fused image. During model training, the label of each image data may have codes, and the label codes of the target image and the auxiliary image may be effectively fused according to the random weight value to obtain the label of the fused image.

Where the random weight value can be determined based on β distribution. Through the β distribution, a random weight value with size between 0-1 can be obtained, such that the random weight value can be used to extract part of the features in the target image data and the auxiliary image data, and fuse the extracted features.

Step 409: training the to-be-trained model with the fused image data.

Specifically, after the fused image data is determined according to the acquired target image data and auxiliary image data, the to-be-trained model can be trained with the determined fused image data. Thereafter, steps 406-409 can be executed again, and the model can be iteratively trained. After the training is performed for preset times, the training can be stopped to obtain the target model.

In the implementation, the random weight value acquired during each cyclical iteration can be different, and when the fused image data is generated, different ratios of the features of the target image data and the auxiliary image data in the fused image data can be adjusted according to the random weight value, so as to obtain richer sample data.

Further, the preset times can be set according to requirements, and after the model is adjusted for the preset times with the fused image data, a target model that can perform the target task may be obtained.

Figure 7:
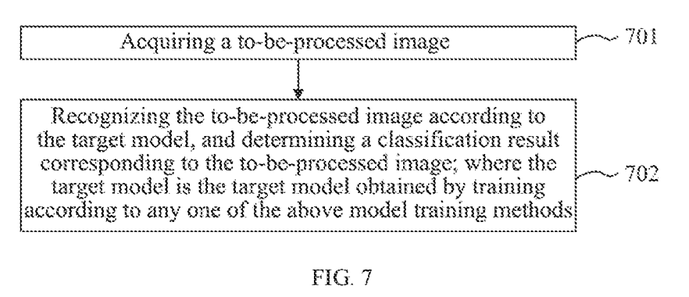
FIG. 7 is a schematic flowchart of a task processing method shown by an exemplary embodiment of the present application.

FIG. 7 is a schematic flowchart of a task processing method shown by an exemplary embodiment of the present application.

As shown in FIG. 7, the task processing method provided by the present application includes:

step 701: acquiring a to-be-processed image;

step 702: recognizing the to-be-processed image according to the target model, and determining a classification result corresponding to the to-be-processed image; where the target model is the target obtained by training according to any one of the above model training methods.

Where when the model is trained based on any one of the above model training methods, since the image data for training the target model is rich, the target model obtained by training is more accurate. Therefore, when the target model is used to recognize the to-be-processed image, the obtained classification result is also more accurate.

Specifically, the to-be-processed image may be input into the target model, and the target model can output a classification result corresponding to the to-be-processed image.

Figure 8:
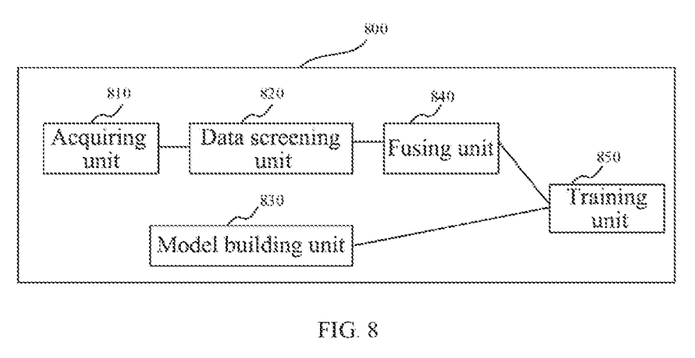
FIG. 8 is a schematic structural diagram of a model training apparatus shown by an exemplary embodiment of the present application.

FIG. 8 is a schematic structural diagram of a model training apparatus shown by an exemplary embodiment of the present application.

As shown in FIG. 8, the model training apparatus 800 provided by the present application includes:

an acquiring unit 810, configured to acquire target image data for learning a target task, and source image data for learning a preset task;

a data screening unit 820, configured to determine auxiliary image data in the source image data according to the target image data;

a model building unit 830, configured to determine a to-be-trained model according to a trained preset model corresponding to the preset task and a preset classification network;

a fusing unit 840, configured to determine fused image data according to the target image data and the auxiliary image data;

a training unit 850, configured to train the to-be-trained model with the fused image data to obtain a target model for executing the target task.

The model training apparatus provided by the present application includes: an acquiring unit, configured to acquire target image data for learning a target task, and source image data for learning a preset task; a data screening unit, configured to determine auxiliary image data in the source image data according to the target image data; a model building unit, configured to determine a to-be-trained model according to a trained preset model corresponding to the preset task and a preset classification network; a fusing unit, configured to determine the fused image data according to the target image data and the auxiliary image data; a training unit, configured to train the to-be-trained model with the fused image data to obtain a target model for executing the target task. The model training apparatus provided by the present application is able to screen auxiliary image data with image data for learning a target task, and further fuse the target image data and the auxiliary image data, so as to train a built and to-be-trained model with the fusion-processed fused image data. This implementation can increase the amount of data for training the model, and the data for training the model is determined is based on the target image data, which is suitable for learning the target task. Therefore, the apparatus provided by the present application can train an accurate target model even if the amount of target image data is not sufficient.

Figure 9:
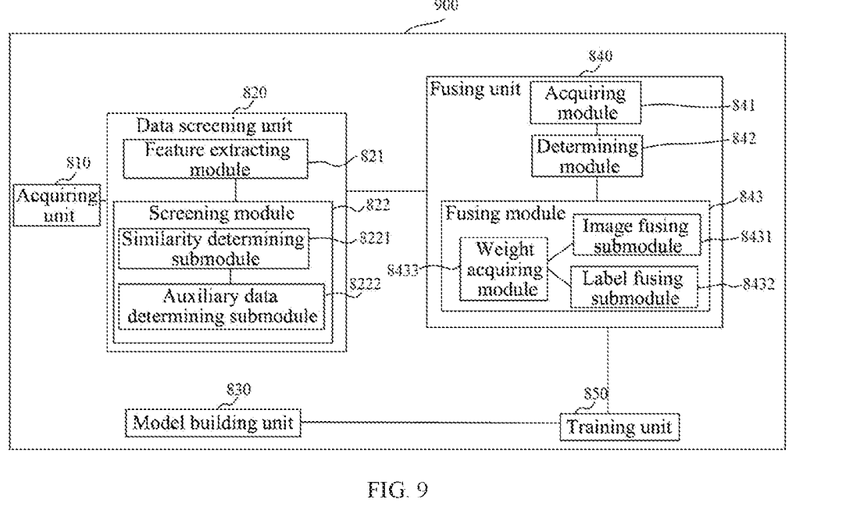
FIG. 9 is a schematic structural diagram of a model training apparatus shown by another exemplary embodiment of the present application.

FIG. 9 is a schematic structural diagram of a model training apparatus shown by another exemplary embodiment of the present application.

As shown in FIG. 9, the model training apparatus 900 provided by the present application is based on the foregoing embodiments, where the fusing unit 840 includes:

an acquiring module 841, configured to acquire a preset number of the target image data and the auxiliary image data;

a determining module 842, configured to determine a plurality of data combinations, each of which comprises one target image data and one auxiliary image data;

a fusing module 843, configured to determine the fused image data according to the data combination.

Where the determining module 842 is specifically configured to:

treat the target image data and the auxiliary image data in a same acquisition order as one data combination.

Where the fusing module 843 includes:

an image fusing submodule 8431, configured to fuse the target image and the auxiliary image belonging to a same data combination to determine a fused image;

a label fusing submodule 8432, configured to fuse a label of the target image and a label of the auxiliary image to determine a label of the fused image.

Where the fusing module 843 further includes a weight acquiring submodule 8433 configured to:

acquire random weight value;

the image fusing submodule 8431 is specifically configured to:

fuse the target image and the auxiliary image with the random weight value to obtain the fused image;

the label fusing submodule 8432 is specifically configured to:

fuse the label of the target image and the label of the auxiliary image with the random weight value to obtain the label of the fused image.

Where the fused image is M=α*S+(1−α)*T; and the label of the fused image is LM=α*LS+(1−α)*LT;

where α is the random weight value, T is the target image, S is the auxiliary image, LT is the label of the target image, and LS is the label of the auxiliary image.

Where the weight acquiring submodule 8433 is specifically configured to:

determine the random weight value based on β distribution.

Where the data screening unit 820 includes:

a feature extracting module 821, configured to input a target image of each target image data into a feature extraction network of the preset model to obtain a target feature corresponding to each target image; inputting a source image of each source image data into the feature extraction network of the preset model to obtain a source feature corresponding to each source image;

a screening module 822, configured to determine the auxiliary image data in the source image data according to each said target feature and each said source feature.

Where the screening module 822 includes:

a similarity determining submodule 8221, configured to determine a similarity between each said target image and each said source image according to each said target feature and each said source feature;

an auxiliary data determining submodule 8222, configured to determine source image data to which the source image similar to the target image belongs as the auxiliary image data according to the similarity.

Where the model building unit 830 is specifically configured to:

determine the to-be-trained network according to a feature extraction network in the preset model and the preset classification network.

Where input dimension of the preset classification network is the same as output dimension of the feature extraction network; output dimension of the preset classification network is the same as the total number of labels included in the target image data and the auxiliary image data.

Where the following steps are cyclically executed for a preset times to obtain the target model:

determining, by the fusing unit 840, fused image data according to the target image data and the auxiliary image data;

training, by the training unit 850, the to-be-trained model with the fused image data.

Figure 10:
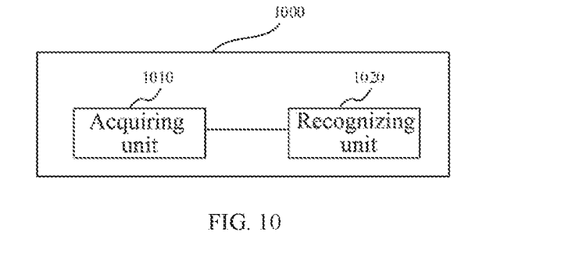
FIG. 10 is a schematic structural diagram of an image processing apparatus shown by an exemplary embodiment of the present application.

FIG. 10 is a schematic structural diagram of an image processing apparatus shown by an exemplary embodiment of the present application.

As shown in FIG. 10, the image processing apparatus 1000 provided by the present application includes:

an acquiring unit 1010, configured to acquire the to-be-processed image;

a recognizing unit 1020, configured to recognize the to-be-processed image according to the target model to determine a classification result corresponding to the to-be-processed image; where the target model is the target model obtained by training according to any one of the previous model training methods.

In an optional implementation, the present application also provides a computer program product, including a computer program, the computer program is stored in a readable storage medium, at least one processor of the electronic device can read the computer program from the readable storage medium, and at least one processor executes the computer program to enable the electronic device to execute the solution provided by any one of the above embodiments.

According to the embodiments of the present application, the present application also provides an electronic device and a readable storage medium.

Figure 11:
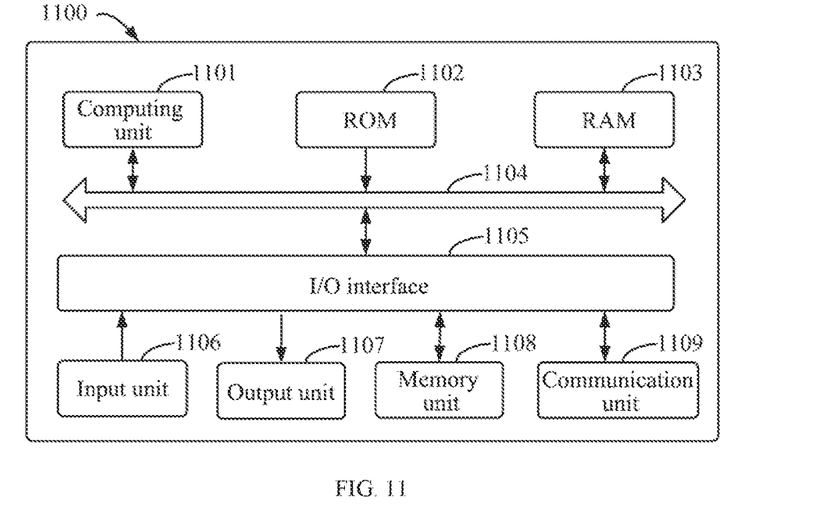
FIG. 11 is a block diagram of an electronic device shown by an exemplary embodiment of the present application.

As shown in FIG. 11, it is a block diagram of an electronic device of the model training method or the image processing method according to the embodiments of the present application. Electronic devices are intended to represent various forms of digital computers, such as laptop computers, desktop computers, workstations, personal digital assistants, servers, blade servers, mainframe computers, and other suitable computers. Electronic devices can also represent various forms of mobile apparatuses, such as personal digital assistant, cellular phones, smart phones, wearable devices, and other similar computing apparatuses. The components shown herein, their connections and relationships, and their functions are merely examples, and are not intended to limit the implementations of the present application described and/or required herein.

As shown in FIG. 11, the electronic device 1100 includes: one or more processor 1101, a memory 1102, and interfaces for connecting various components, including a high-speed interface and a low-speed interface. The various components are connected to each other using different buses, and can be installed on a common motherboard or installed in other ways as needed. The processor may process instructions executed in the electronic device, including instructions stored in or on the memory to display graphical information of the GUI on an external input/output apparatus (such as a display device coupled to an interface). In other implementations, if necessary, a plurality of processors and/or a plurality of buses can be used with a plurality of memories. Similarly, a plurality of electronic devices can be connected, and each device provides some necessary operations (for example, as a server array, a group of blade servers, or a multi-processor system). In FIG. 11, a processor 1101 is taken as an example.

The memory 1102 is the non-transitory computer-readable storage medium provided by the present application. Where the memory stores instructions executable by at least one processor, so as to enable the at least one processor to execute the model training method or the image processing method provided by the present application. The non-transitory computer-readable storage medium of the present application stores computer instructions, which are used to enable the computer to execute the model training method or the image processing method provided by the present application.

The memory 1102, as a non-transitory computer-readable storage medium, can be used to store non-transitory software programs, non-transitory computer-executable programs and modules, such as the program instructions/modules corresponding to the model training method or the image processing method in the embodiments of the present application (for example, the acquiring unit 810, the data screening unit 820, the model building unit 830, the fusing unit 840, and the training unit 850 shown in FIG. 8; for another example, the acquiring unit 1010 and the recognizing unit 1020 in FIG. 10). The processor 1101 executes various functional applications and data processing of the server by running non-transitory software programs, instructions, and modules stored in the memory 1102, i.e., implements the model training method or the image processing method in the above method embodiments.

The memory 1102 may include a storage program area and a storage data area, where the storage program area may store an operating system and an application program required by at least one function; the storage data area may store the created data by using the electronic device 1100 according to the model training method or the image processing method, etc. In addition, the memory 1102 may include a high-speed random access memory, and may also include a non-transitory memory, such as at least one magnetic disk storage device, a flash memory device, or other non-transitory solid-state storage devices. In some embodiments, the memory 1102 may optionally include memories remotely provided with respect to the processor 1101, and these remote memories may be connected to the electronic device 1100 of the model training method or the image processing method via a network. Examples of the aforementioned networks include, but are not limited to, the Internet, corporate intranets, local area networks, mobile communication networks, and combinations thereof.

The electronic device 1100 of the model training method or the image processing method may further include: an input apparatus 1103 and an output apparatus 1104. The processor 1101, the memory 1102, the input apparatus 1103, and the output apparatus 1104 may be connected via buses or in other methods. In FIG. 11, the connection via a bus is taken as an example.

The input apparatus 1103 can receive input digital or character information, and generate key signal input related to the user settings and function control of the electronic device 1100 of the model training method or the image processing method (input apparatus such as touch screen, keypad, mouse, trackpad, touch pad, pointing stick, one or more mouse buttons, trackball, joysticks, etc.). The output apparatus 1104 may include a display device, an auxiliary lighting apparatus (for example, LED), a tactile feedback apparatus (for example, a vibration motor), and the like. The display device may include, but is not limited to, a liquid-crystal display (LCD), a light emitting diode (LED) display, and a plasma display. In some implementations, the display device may be a touch screen.

Various implementations of the systems and techniques described herein can be implemented in digital electronic circuit systems, integrated circuit systems, special-purpose ASICs (application specific integrated circuit), computer hardware, firmware, software, and/or combinations thereof. These various implementations may include being implemented in one or more computer programs, the one or more computer programs may be executed and/or interpreted on a programmable system including at least one programmable processor, the programmable processor can be a special-purpose or general-purpose programmable processor that can receive data and instructions from the memory system, at least one input apparatus, and at least one output apparatus, and transmit the data and instructions to the memory system, the at least one input apparatus, and the at least one output apparatus.

These computer programs (also called programs, software, software applications, or codes) include machine instructions for programmable processors, and can be implemented using high-level procedures and/or object-oriented programming languages, and/or assembly/machine language. As used herein, the terms "machine-readable medium" and "computer-readable medium" refer to any computer program product, device, and/or apparatus (for example, magnetic disks, optical disks, memories, programmable logic devices (PLDs)) used to provide machine instructions and/or data to a programmable processor, including machine-readable medium that receive machine instructions as machine-readable signals. The term "machine-readable signal" refers to any signal used to provide machine instructions and/or data to a programmable processor.

In order to provide interaction with the user, the systems and techniques described herein can be implemented on a computer that has: a display apparatus for displaying information to the user (for example, a CRT (cathode ray tube) or LCD (liquid-crystal display) monitor); and a keyboard and a pointing apparatus (for example, a mouse or a trackball) through which the user can provide input to the computer. Other types of apparatuses can also be used to provide interaction with the user; for example, the feedback provided to the user can be any form of sensory feedback (for example, visual feedback, auditory feedback, or tactile feedback); and can be in any form (including acoustic input, voice input, or tactile input) to receive input from the user.

The systems and technologies described herein can be implemented in a computing system that includes background components (for example, as a data server), or a computing system that includes middleware components (for example, an application server), or a computing system that includes front-end components (for example, a user computer with a graphical user interface or web browser through which the user can interact with the implementation of the system and technique described herein), or a computing system includes any combination of such background components, middleware components, or front-end components. The components of the system can be connected to each other through any form or medium of digital data communication (for example, a communication network). Examples of communication networks include: local area network (LAN), wide area network (WAN), and the Internet.

The computer system can include a client and a server. The client and server are generally far away from each other and usually interact through a communication network. The relationship between the client and the server is generated by computer programs that run on the corresponding computers and have a client-server relationship with each other. The server can be a cloud server (also known as a cloud computing server or a cloud host), a host product in the cloud computing service system to solve the defects of difficult management and weak business scalability in traditional physical host and VPS service ("Virtual Private Server", or "VPS" for short). The server can also be a server of a distributed system, or a server combined with a blockchain.

It should be understood that the various forms of processes shown above can be used to reorder, add or delete steps. For example, the steps described in the present application can be executed in parallel, sequentially, or in a different order, as long as the desired result of the technical solution disclosed in the present application can be achieved, which is not limited herein.

The foregoing specific implementations do not constitute a limitation on the protection scope of the present application. Those skilled in the art should understand that various modifications, combinations, sub-combinations and substitutions can be made according to design requirements and other factors. Any modification, equivalent replacement, improvement and the like made within the spirit and principle of the present application shall be included in the protection scope of the present application.

What is claimed is:

1. A model training method, comprising:
   acquiring target image data for learning a target task, and source image data for learning a preset task;
   determining auxiliary image data in the source image data according to the target image data;
   determining a to-be-trained model according to a trained preset model corresponding to the preset task and a preset classification network;
   determining fused image data according to the target image data and the auxiliary image data, and
   training the to-be-trained model with the fused image data, to obtain a target model for executing the target task.

2. The method according to claim 1, wherein the determining fused image data according to the target image data and the auxiliary image data comprises:
   acquiring a preset number of the target image data and the auxiliary image data;
   determining a plurality of data combinations, each data combination comprises one target image data and one auxiliary image data; and
   determining the fused image data according to a data combination.

3. The method according to claim 2, wherein the determining a plurality of data combinations comprises:
   treating the target image data and the auxiliary image data in a same acquisition order as one data combination.

4. The method according to claim 2, wherein the determining the fused image data according to the data combination comprises:
   fusing the target image and the auxiliary image belonging to a same data combination to determine a fused image;
   fusing a label of the target image and a label of the auxiliary image to determine a label of the fused image.

5. The method according to claim 4, further comprising:
   acquiring random weight value;
   the fusing the target image and the auxiliary image belonging to a same data combination to determine a fused image comprises:
   fusing the target image and the auxiliary image with the random weight value to obtain the fused image;
   the fusing a label of the target image and a label of the auxiliary image to determine a label of the fused image comprises:
   fusing the label of the target image and the label of the auxiliary image with the random weight value to obtain the label of the fused image.

6. The method according to claim 5, wherein,
   the fused image is $M=\alpha*S+(1-\alpha)*T$; and the label of the fused image is $LM=\alpha*LS+(1-\alpha)*LT$;
   wherein $\alpha$ is the random weight value, T is the target image, S is the auxiliary image, LT is the label of the target image, and LS is the label of the auxiliary image.

7. The method according to claim 5, wherein the acquiring random weight value comprises:
   determining the random weight value based on $\beta$ distribution.

8. The method according to claim 1, wherein the determining auxiliary image data in the source image data according to the target image data comprises:
   inputting a target image of each target image data into a feature extraction network of the preset model to obtain a target feature corresponding to each target image;
   inputting a source image of each source image data into the feature extraction network of the preset model to obtain a source feature corresponding to each source image;
   determining the auxiliary image data in the source image data according to each target feature and each source feature.

9. The method according to claim 8, wherein the determining the auxiliary image data in the source image data according to each target feature and each source feature comprises:
   determining a similarity between each target image and each source image according to each target feature and each source feature;
   determining source image data to which the source image similar to the target image belongs as the auxiliary image data according to the similarity.

10. The method according to claim 1, wherein the determining a to-be-trained model according to a trained preset model corresponding to the preset task and a preset classification network comprises:
    determining the to-be-trained network according to a feature extraction network in the preset model and the preset classification network.

11. The method according to claim 10, wherein an input dimension of the preset classification network is the same as an output dimension of the feature extraction network; and output dimension of the preset classification network is the same as the total number of labels comprised in the target image data and the auxiliary image data.

12. The method according to claim 1, wherein the determining fused image data according to the target image data and the auxiliary image data, and training the to-be-trained model with the fused image data comprises:
    cyclically executing the following steps for preset times to obtain the target model:
    determining the fused image data according to the target image data and the auxiliary image data;
    training the to-be-trained model with the fused image data.

13. An image processing method, comprising:
    acquiring a to-be-processed image;
    recognizing the to-be-processed image according to a target model to determine a classification result corresponding to the to-be-processed image; wherein the target model is the target model trained by the model training method according to claim 1.

14. An image processing apparatus, comprising:
    at least one processor; and
    a memory communicatively connected with the at least one processor; wherein,
    the memory stores instructions executable by the at least one processor, and the instructions are executed by the at least one processor, so that the at least one processor is configured to:
    acquire a to-be-processed image;
    recognize the to-be-processed image according to a target model to determine a classification result corresponding to the to-be-processed image; wherein the target model is the target model trained by the model training method according to claim 1.

15. A non-transitory computer-readable storage medium storing computer instructions for causing a computer to execute the method according to claim 1.

16. A model training apparatus, comprising:
at least one processor; and
a memory communicatively connected with the at least one processor; wherein,
the memory stores instructions executable by the at least one processor, and the instructions are executed by the at least one processor, so that the at least one processor is configured to:
acquire target image data for learning a target task, and source image data for learning a preset task;
determine auxiliary image data in the source image data according to the target image data;
determine a to-be-trained model according to a trained preset model corresponding to the preset task and a preset classification network;
determine fused image data according to the target image data and the auxiliary image data;
train the to-be-trained model with the fused image data to obtain a target model for executing the target task.

17. The apparatus according to claim 16, wherein the at least one processor is further configured to:
acquire a preset number of the target image data and the auxiliary image data;
determine a plurality of data combinations, each of which comprises one target image data and one auxiliary image data;
determine the fused image data according to the data combination.

18. The apparatus according to claim 17, wherein the at least one processor is further configured to:
treat the target image data and the auxiliary image data in a same acquisition order as one data combination.

19. The apparatus according to claim 17, wherein the at least one processor is further configured to:
fuse the target image and the auxiliary image belonging to a same data combination to determine a fused image;
fuse a label of the target image and a label of the auxiliary image to determine a label of the fused image.

20. The apparatus according to claim 19, wherein the at least one processor is further configured to:
acquire random weight value;
fuse the target image and the auxiliary image with the random weight value to obtain the fused image;
fuse the label of the target image and the label of the auxiliary image with the random weight value to obtain a label of the fused image.

* * * * *